(12) United States Patent
Hung et al.

(10) Patent No.: US 8,248,310 B2
(45) Date of Patent: Aug. 21, 2012

(54) OUTER COVER FOR COMMUNICATION DEVICE AND METHOD FOR FABRICATING THE SAME

(75) Inventors: Chien-Ming Hung, Taipei (TW); Shen-Yuan Lee, Taipei (TW)

(73) Assignee: Asustek Computer Inc., Taipei (TW)

( * ) Notice: Subject to any disclaimer, the term of this patent is extended or adjusted under 35 U.S.C. 154(b) by 321 days.

(21) Appl. No.: 12/432,368

(22) Filed: Apr. 29, 2009

(65) Prior Publication Data

US 2009/0322629 A1 Dec. 31, 2009

(30) Foreign Application Priority Data

Jun. 27, 2008 (TW) ................................ 97124140 A (51) Int. Cl.
*H01Q 1/24* (2006.01)
(52) U.S. Cl. ........................................ 343/702; 343/873
(58) Field of Classification Search .................. 343/702, 343/872, 873
See application file for complete search history.

(56) References Cited

U.S. PATENT DOCUMENTS

| | | | |
|---|---|---|---|
| 6,366,261 B1 * | 4/2002 | Stout et al. | 343/872 |
| 6,839,029 B2 * | 1/2005 | Mendolia et al. | 343/700 MS |
| 7,358,927 B2 * | 4/2008 | Luebke et al. | 343/907 |
| 7,388,543 B2 * | 6/2008 | Vance | 343/700 MS |
| 7,486,243 B2 * | 2/2009 | Wulff et al. | 343/702 |
| 7,605,766 B2 * | 10/2009 | Dahlstrom et al. | 343/702 |
| 7,948,358 B2 * | 5/2011 | Hidaka et al. | 340/5.61 |
| 2003/0174091 A1 | 9/2003 | Mendolia et al. | |

FOREIGN PATENT DOCUMENTS

CN 101022184 A 8/2007

* cited by examiner

*Primary Examiner* — Tho G Phan
(74) *Attorney, Agent, or Firm* — Morris Manning & Martin LLP; Tim Tingkang Xia, Esq.

(57) ABSTRACT

The invention provides an outer cover adapted to a communication device, a communication device including the same and a method for manufacturing the same. The outer cover according to the invention includes a cover body and an antenna. The cover body has a bottom surface. Particularly, the antenna is fixed at a predetermined position on the bottom surface by an insert molding process.

17 Claims, 6 Drawing Sheets

OUTER COVER FOR COMMUNICATION DEVICE AND METHOD FOR FABRICATING THE SAME

BACKGROUND OF THE INVENTION

1. Field of the Invention

The invention relates to an outer cover, more particularly, to an outer cover that integrated with the antenna of a mobile communication device by an insert molding process.

2. Description of the Prior Art

Mobile communication devices such as global system for mobile (GSM) mobile phones, personal handy-phone system (PHS) mobile phones, code division multiple access (CDMA) mobile phones, personal digital assistant (PDA) with communication functions, the handheld personal computers and so on become necessary communication and entertainment tools in human life nowadays. The mobile communication devices achieve the communication function by radiating through antennas.

Currently, there are mainly two kinds of antennas used in mobile communication devices. One external antenna is a kind of antenna which protrudes from a mobile communication device and is telescopic or adjustable in angle. The other is a kind of antenna called "internal antenna" which is disposed inside the mobile communication device and often flat-shaped. The external antenna usually has higher radiation efficiency and can provide preferable communication quality. The internal antenna is usually smaller, lighter and slighter than the external antenna, and it usually has a low cost. In addition, the mobile communication device using the internal antenna can be various in appearances when it is designed. This meets the demand of the market.

Figure 1A:
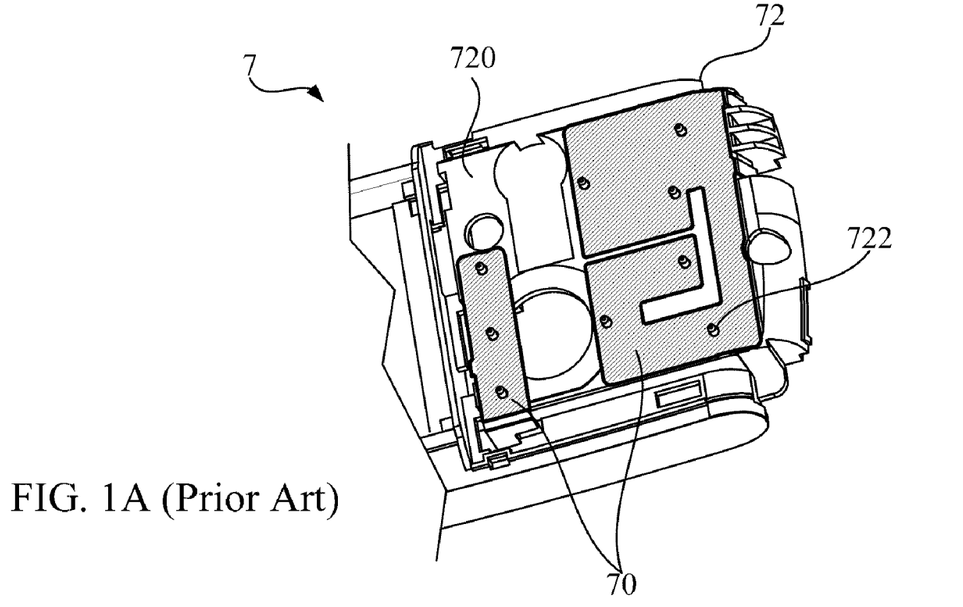
FIG. 1A is a schematic diagram showing that a metal antenna in the prior art is disposed in a mobile communication device.
Figure 1B:
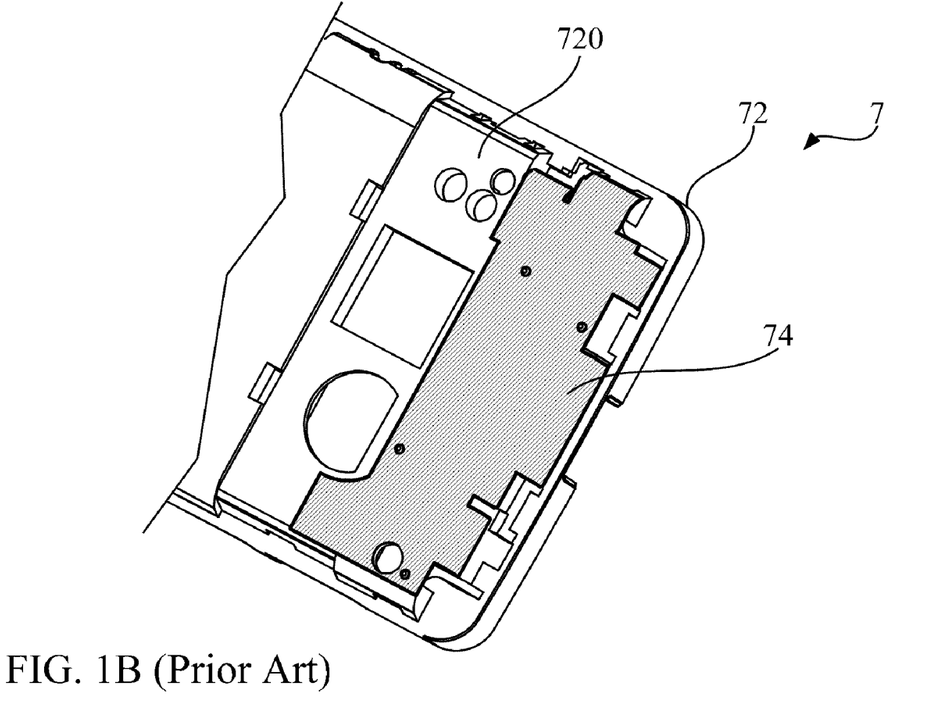
FIG. 1B is a schematic diagram showing that a FPC antenna in the prior art is disposed in a mobile communication device.
Figure 1C:
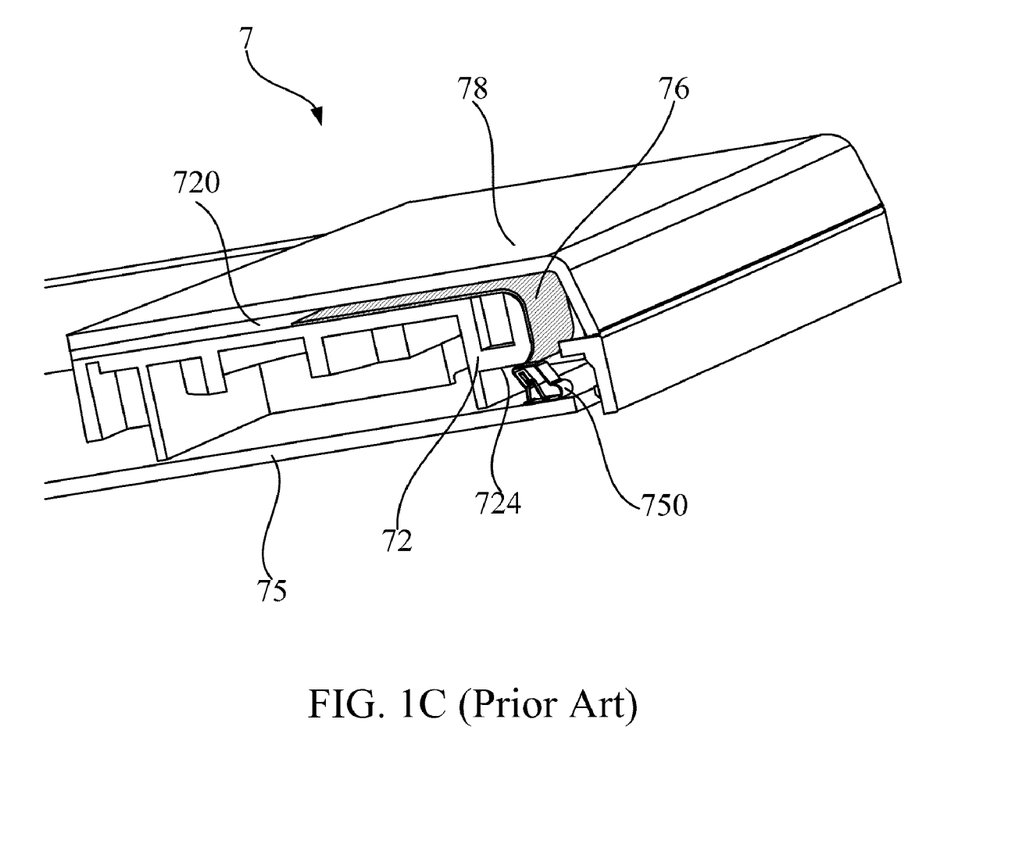
FIG. 1C is a sectional diagram showing the mobile communication device in the prior art.

The material of the common internal antennas includes the metal and the flexible printed circuit (FPC). FIG. 1A is a schematic diagram showing that a metal antenna in the prior art is disposed in a mobile communication device. FIG. 1B is a schematic diagram showing that a FPC antenna in the prior art is disposed in a mobile communication device. FIG. 1C is a sectional diagram showing the mobile communication device in the prior art.

As shown in FIG. 1A, the internal antenna 70 made of metal is usually fixed at the back 720 of the main framework 72 of the mobile communication device 7 in a heating fusing mode. Therefore, multiple heat fusion pillars 722 are usually formed at the back 720. As shown in FIG. 1B, the internal antenna 74 made of FPC is usually stuck to the back 720 of the main framework 72 of the mobile communication device 7 with glue. Furthermore, as shown in FIG. 1C, the internal antenna 76 is usually designed to extend to the front 724 of the main framework 72 to contact the metal elastic element 750 on the circuit board 75 of the communication device 7. Therefore, the internal antenna 76 may be electrically connected to the circuit board 75. In addition, the conventional mobile communication device 7 further includes a back cover 78 fastened to the main framework 72 to cover and protect the back 720 of the main framework 72 and the internal antenna 76.

However, the internal antenna needs to be fixed at the main framework in the heating fusing mode or sticking mode. This not only consumes much manufacturing time, but is also affected by human factors.

In addition, the mobile communication device nowadays is designed to be more and more light and slight. This limits the distance between the internal antenna and the circuit board (that is, the height of the antenna). Thus, the efficacy of the internal antenna is affected.

SUMMARY OF THE INVENTION

According to an embodiment of the invention, the outer cover may be adapted to a communication device and includes a cover body and an antenna. The cover body has a bottom surface. Especially, the antenna is fixed at a predetermined position on the bottom surface by an insert molding process.

According to a preferable embodiment of the invention, the communication device mainly includes a circuit board and an outer cover. The circuit board is disposed in the communication device, and the outer cover includes a cover body and an antenna. The cover body has a bottom surface, and the antenna is fixed at a predetermined position on the bottom surface by an insert molding process to make the antenna keep a predetermined distance from the circuit board when the communication device is assembled.

In another aspect, the invention provides a method for manufacturing the outer cover.

According to a preferable embodiment of the invention, the method mainly includes the steps as follows. (a) The antenna is located in a mold accommodating chamber. (b) Filling material is filled in the mold accommodating chamber to form the cover body of the outer cover to make the antenna fixed at the predetermined position on the bottom surface of the cover body.

Since the outer cover in the invention is integrated with the antenna by the insert molding process, manufacturing cost and time are saved. In addition, the outer cover manufactured via the method of the invention is integrated with the antenna, and therefore, the strength of the outer cover is improved. In actual application, on the premise that the same strength is obtained, the outer cover in the invention is slighter than that in the prior art. This means that the distance between the antenna and the circuit board in the invention (the height of the antenna) is bigger than that in the prior art, and on the premise that the thickness of the communication device does not increase, the efficacy of the antenna is improved.

These and other features, aspects and advantages of the present invention will become better understood with regard to the following description, appended claims, and accompanying drawings.

DETAILED DESCRIPTION OF THE INVENTION

The invention provides an outer cover integrated with an antenna, a communication device including the outer cover and a method for manufacturing the same. In actual application, the communication device may be a mobile phone, a personal digital assistant (PDA), a handheld computer, a positioning device (such as a GPS device) and so on, and it is not used to limit the scope of the invention.

Figure 2:
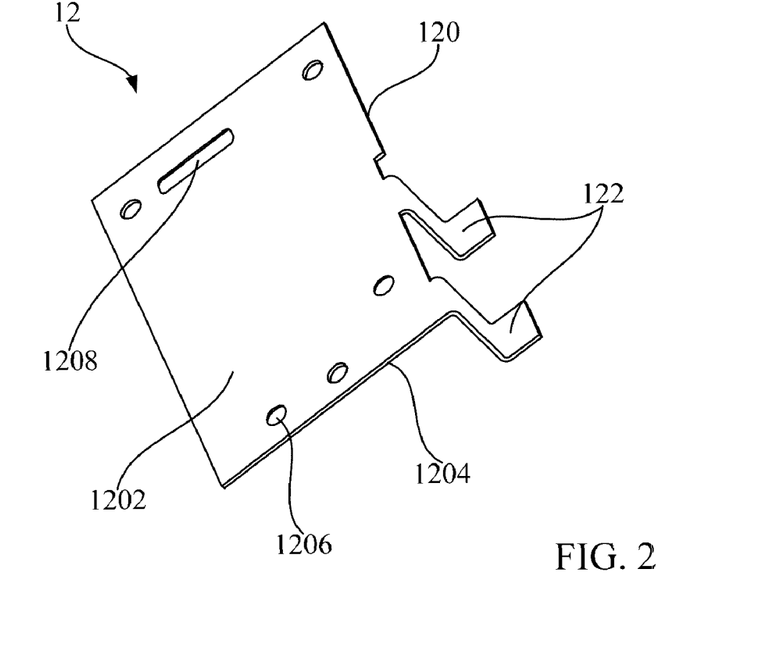
FIG. 2 is a schematic diagram showing an antenna according to an embodiment of the invention.
Figure 3:
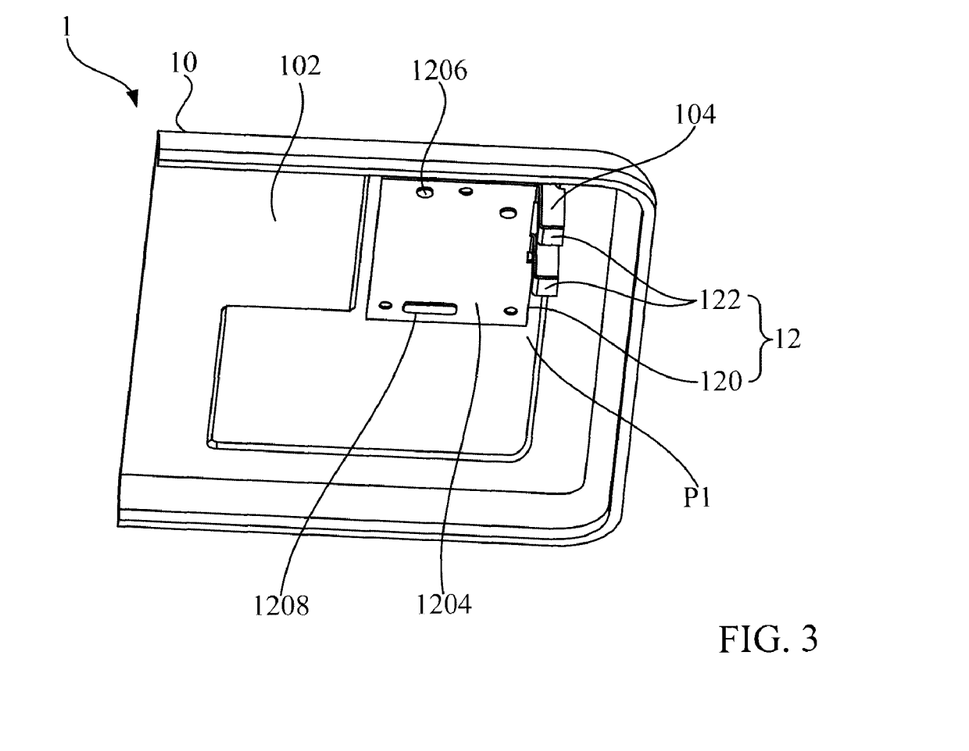
FIG. 3 is a schematic diagram showing the outer cover integrated with the antenna in FIG. 2.

FIG. 2 is a schematic diagram showing an antenna according to an embodiment of the invention. FIG. 3 is a schematic diagram showing the outer cover integrated with the antenna in FIG. 2. As shown in FIG. 2 and FIG. 3, the outer cover 1 in the invention includes a cover body 10 and an antenna 12. The cover body 10 has a bottom surface 102, and the antenna 12 is fixed at a predetermined position P1 on the bottom surface 102 by an insert molding process. The predetermined position P1 may be adjusted according to requirements, and it is not limited in the embodiment. In addition, an indentation may be formed at the predetermined position P1 to assist in fixing the antenna 12.

In actual application, the filling material forming the cover body 10 may be non-metal such as the plastic cement or other proper materials. The material of the antenna 12 may be metal such as copper, aluminum, alloy or other proper materials. In addition, the parameters and steps of the insert molding process in the invention may be adjusted according to different materials.

Furthermore, as shown in FIG. 2, the antenna 12 mainly includes a main body 120 and an extending portion 122 bended and extending from the main body 120. The main body 120 is fixed at a predetermined position P1 on the bottom surface 102, and the extending portion 122 is bended and extends from the main body 120.

In addition, the main body 120 includes a first surface 1202 and a second surface 1204 corresponding to each other. In addition, the main body 120 has a position hole 1206 going through from the first surface 1202 to the second surface 1204. The position hole 1206 assists the antenna 12 in the mold accommodating chamber in locating during the insert molding process. In actual application, the position hole does not need to go through the first surface and the second surface, and it only needs to achieve the locating function. In the insert molding process, the external shape of the antenna 12 also may be designed to make a convenient for locating the antenna 12 in the mold accommodating chamber.

As shown in FIG. 2, a fixing hole 1208 going through the first surface 1202 and the second surface 1204 is formed on the main body 120. In the insert molding process, the filling material forming the cover body 10 may flow from the first surface 1202 to the second surface 1204 along the fixing hole 1208. Therefore, after the filling material is solidified, it assists in fixing the antenna at the predetermined position P1 firmly.

In actual application, the antenna may include different pre-formed patterns or shapes according to different function requirements. In addition, different kinds of antennas such as a bent-wire antenna, a patch antenna, a planar inverted F antenna and other proper antennas are adapted for the invention.

In actual application, the outer cover in the invention may be integrated with more than one antenna. For example, it may be integrated with multiple antenna portions used for the GSM communication. The outer cover also may be integrated with more than one kind of antenna. It may be integrated with two kinds of antennas used for GSM communication and GPS positioning.

In addition, as shown in FIG. 3, during the insert molding process, the bottom surface 102 of the cover body 10 has a protruding portion 104 corresponding to the extending portion 112 of the antenna to support the extending portion 122. When the outer cover 1 is assembled to the communication device, the protruding portion 104 may make the main body 120 of the antenna 12 keep a predetermined distance from the circuit board of the communication device.

The protruding portion 104 may be formed by designing the mold. Since the mold design is well known in the relevant technical field of the invention, it is not described herein for concise purpose. The length of the protruding portion 104 may be adjusted according to requirements (such as the requirement of the predetermined distance, the requirement of the whole thickness of the communication device), and it is not limited to be any particular length.

Figure 4A:
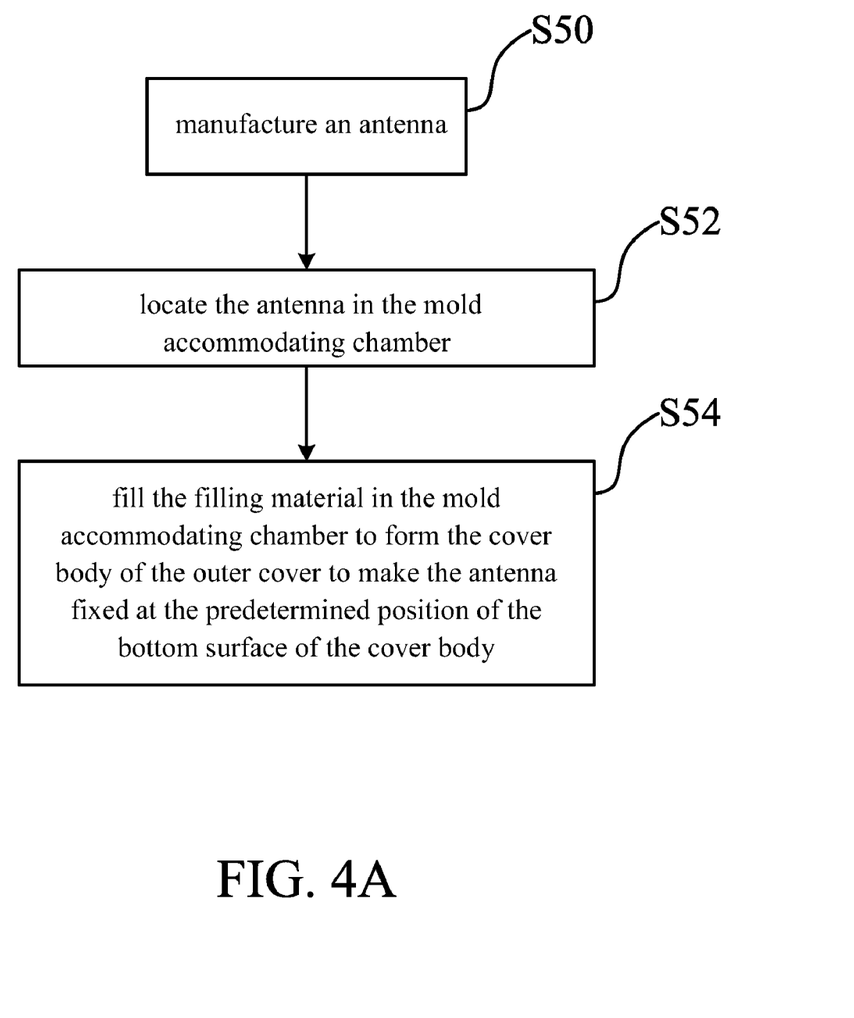
FIG. 4A is a flow chart showing a method for manufacturing the outer cover according to an embodiment of the invention.

FIG. 4A is a flow chart showing the method for manufacturing the outer cover according to an embodiment of the invention. As shown in FIG. 4, the method includes the steps as follows.

In step S50, the antenna as stated above is manufactured. In step S52, the antenna manufactured in step S50 is located in the mold accommodating chamber. In step S54, the filling material is filled in the mold accommodating chamber to form the cover body of the outer cover to make the antenna fixed at the predetermined position on the bottom surface of the cover body. The outer cover manufactured via this method is like the cover shown in FIG. 3.

The filling material forming the cover body may be non-metal material such as the plastic cement or other proper materials. The antenna is made of metal such as copper, aluminum, alloy or other proper materials. In addition, the parameters in every step of the method in the invention may be adjusted according to different materials.

Figure 4B:
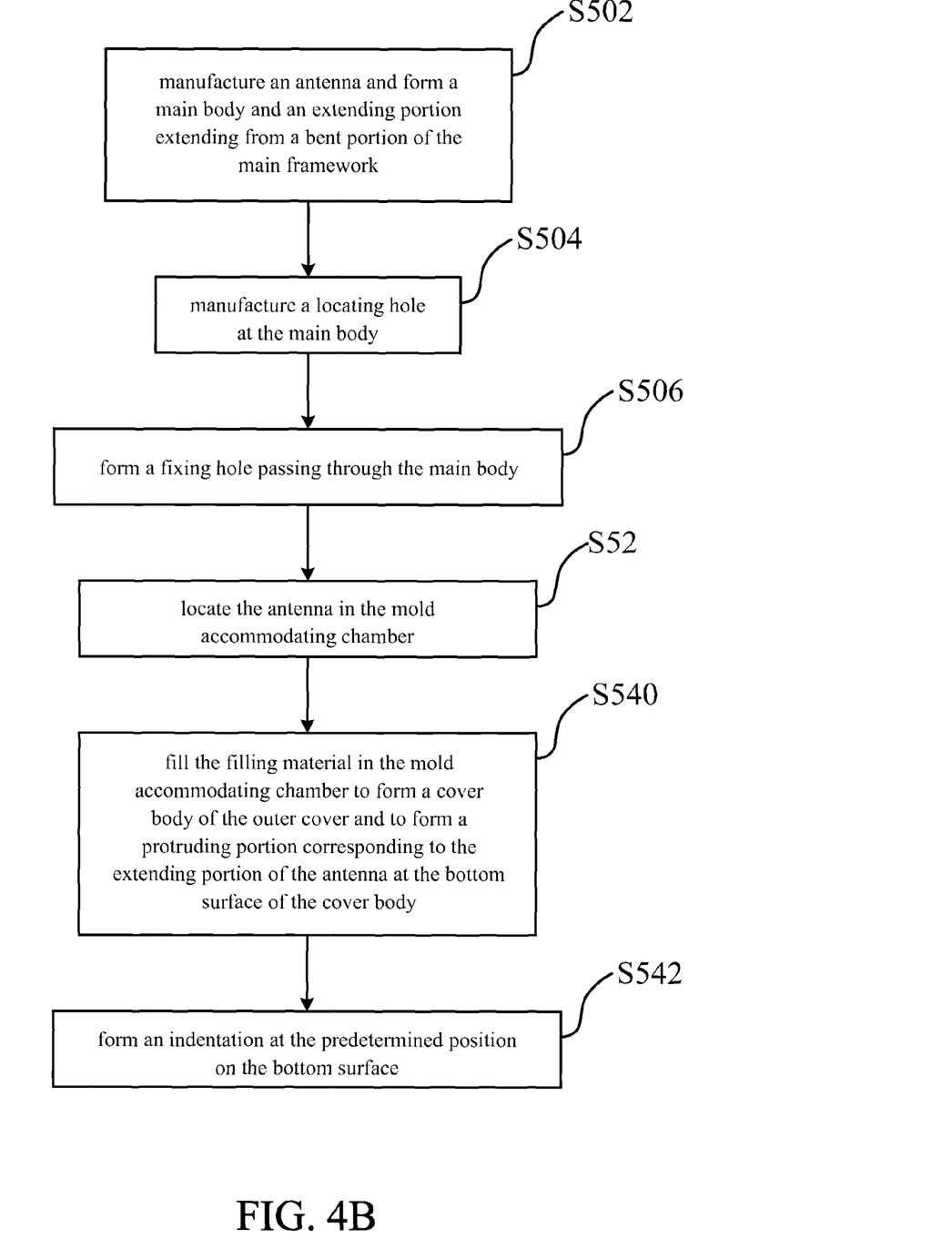
FIG. 4B is a flow chart showing a method for manufacturing the outer cover according to an embodiment of the invention.

FIG. 4B is a flow chart showing the method for manufacturing the outer cover according to an embodiment of the invention. As shown in FIG. 4B, step S50 may further include the steps as follows.

In step S502, a main body and an extending portion bended and extending from the main body are formed on the antenna. The main body may be fixed at the predetermined position on the bottom surface of the cover body in step S54. In addition, when the outer cover is assembled to the communication device, the extending portion of the antenna contacts the circuit board of the communication device to make the antenna electrically connected to the circuit board.

In step S504, a position hole is formed at the main body. The position hole may assist in fixing the antenna in the mold accommodating chamber in step S52.

In step S506, a fixing hole going through the main body is formed in the main body to make the filling material flow from the first surface of the antenna to the corresponding second surface along the fixing hole in step S54. The filling material is solidified to assist in fixing the antenna to the predetermined position firmly.

Step S502 to step S506 may be integrated to be a single step, or they are further divided into several sub-steps. In addition, the order of the steps may be properly adjusted or changed.

As shown in FIG. 4B, the step S54 may further include the steps as follows. In step S540, a protruding portion corresponding to the extending portion of the antenna is formed on the bottom surface of the cover body to support the extending portion and make the main body of the antenna keep a predetermined distance from the circuit board. In step S542, an indentation is formed at the predetermined position on the bottom surface to assist in fixing the antenna. In actual application, step S540 and step S542 may be integrated to be a single step, or the order of step S540 and step S542 may be adjusted.

Figure 5:
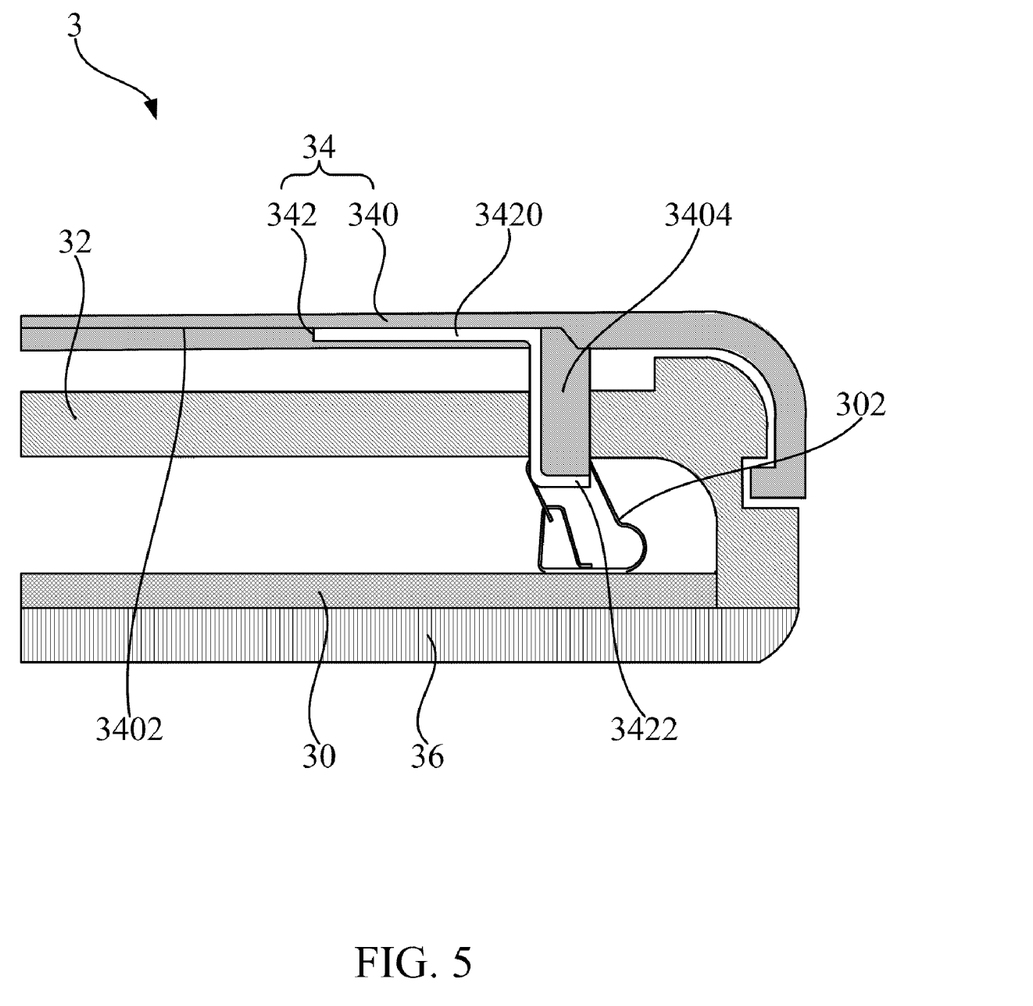
FIG. 5 is a sectional diagram showing a communication device according to an embodiment of the invention.

The invention also provides a communication device including the outer cover. FIG. 5 is a sectional diagram showing the communication device according to an embodiment of the invention. As shown in FIG. 5, the communication device 3 includes a circuit board 30, a main framework 32, the outer cover 34 and a front cover 36.

The circuit board 30 may be disposed inside the communication device 3 (the space formed by the outer cover 34 and the front cover 36) and includes kinds of components and circuits needed when the communication device 3 works. The main framework 32 is disposed between the circuit board 30 and the outer cover 34 to fix the circuit board 30 and the outer cover 34, respectively. In actual application, the main framework 32 also may be used to fix other components of the communication device 3 such as a loudspeaker, a lens, a screen, a keypad and so on.

The outer cover 34 includes a cover body 340 and an antenna 342. The cover body 340 has a bottom surface 3402, and the antenna 342 is fixed at a predetermined position on the bottom surface 3402 by an insert molding process. The antenna 342 includes a main body 3420 and an extending portion 3422 bended and extending from the main body 3420. The main body 3420 of the antenna 342 is fixed to the predetermined position.

In actual application, a position hole may be formed on the main body 3420 of the antenna 342 according to the requirements to assist in locating the antenna 342 in the mold accommodating chamber during the insert molding process. In addition, in actual application, a fixing hole also may be formed in the main body 3420 of the antenna 342 to assist in fixing the antenna 342 at the predetermined position firmly. The detailed description about the position hole and the fixing hole are illustrated in above embodiments, and they are not described again for concise purpose.

As shown in FIG. 5, a protruding portion 3404 is at the bottom surface 3402 of the cover body 340 corresponding to the extending portion 3422 of the antenna 342. When the communication device 3 is assembled, the protruding portion 3404 may support the extending portion 3422 to contact the circuit board 30 and to make the antenna 342 electrically connected to the circuit board 30. In addition, in the embodiment, the extending portion 3422 contacts the circuit board 30 through the metal elastic element 302. The extending portion 3422 also may contact the circuit board 30 directly or through other components.

In addition, the protruding portion 3404 also may make the main body 3420 keep a predetermined distance from the circuit board 30 (the distance may be approximately equal to the height resulting from adding the length of the protruding portion 3404 to the height of the metal elastic element 302). In other words, in the invention, the objective of adjusting the predetermined distance may be achieved by adjusting the length of the protruding portion 3404. Similarly, as shown in FIG. 5, an indentation is formed on the predetermined position to assist in fixing the antenna 342.

Since the antenna 342 in the invention is integrated with the cover body 340 by an insert molding process, the height of the antenna (almost the distance between the main body 3420 of the antenna 342 and the ground plane (the circuit board 30)) of the communication device 3 may be bigger than the height of the antenna in the prior art when the antenna 342 is disposed at the back of the main framework 32. This may improve the efficacy of the antenna.

To sum up, compared with the prior art, the outer cover in the invention is integrated with the antenna by the insert molding process to reduce the manufacturing cost and time. In addition, on the premise that the whole thickness of the communication device is not increased, the efficacy of the antenna is improved. In addition, the metal antenna may increase the strength of the non-metal outer cover.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An outer cover adapted for a communication device, comprising:
    a cover body having a bottom surface; and
    an antenna comprising:
        a main body fixed at a predetermined position on the bottom surface by an insert molding process; and
        an extending portion bended and extending from the main body,
    wherein a protruding portion corresponding to the extending portion is disposed at the bottom surface of the cover body to support the extending portion and to keep a predetermined distance from the main body of the antenna and a circuit board in the communication device.

2. The outer cover according to claim 1, wherein when the outer cover is assembled to the communication device, the extending portion contacts the circuit board in the communication device to make the antenna electrically connected to the circuit board.

3. The outer cover according to claim 2, wherein the main body has a position hole for assisting in fixing the antenna.

4. The outer cover according to claim 1, wherein an indentation is formed at the predetermined position to assist in fixing the antenna.

5. The outer cover according to claim 1, wherein the communication device is selected from the group consisting of a mobile phone, a personal digital assistant, a handheld computer and a positioning device.

6. The outer cover according to claim 1, wherein the cover body is made of non-metal, and the antenna is made of metal.

7. A communication device comprising:
    a circuit board disposed in the communication device; and
    an outer cover including a cover body and an antenna, wherein the cover body has a bottom surface, and the antenna has a main body and an extending portion, the main body is fixed at a predetermined position on the bottom surface by an insert molding process, the extending portion is bended and extends from the main body, wherein a protruding portion corresponding to the extending portion is disposed at the bottom surface of the cover body to support the extending portion and make the main body of the antenna keep a predetermined distance from the circuit board.

8. The communication device according to claim 7, wherein when the communication device is assembled, the extending portion contacts the circuit board to make the antenna electrically connected to the circuit board.

9. The communication device according to claim 8, wherein the main body has a position hole to assist in fixing the antenna.

10. The communication device according to claim 7, further comprising:
 a main framework disposed between the outer cover and the circuit board for fixing the outer cover and the circuit board, respectively.

11. The communication device according to claim 7, wherein an indentation is formed at the predetermined position to assist in fixing the antenna.

12. The communication device according to claim 7, wherein the cover body is made of non-metal, and the antenna is made of metal.

13. A method for manufacturing an outer cover adapted for a communication device, the method comprising the steps of:
 (a) locating an antenna in a mold accommodating chamber;
 (b) manufacturing the antenna to make the antenna include a main body and an extending portion bended and extending from the main body;
 (c) filling a filling material into the mold accommodating chamber to form a cover body of the outer cover to make the antenna fixed at a predetermined position on a bottom surface of the cover body; and
 (d) forming a protruding portion at the bottom surface of the cover body, wherein the protruding portion corresponds to the extending portion of the antenna to support the extending portion and make the main body of the antenna keep a predetermined distance from a circuit board in the communication device.

14. The method according to claim 13, wherein the main body of the antenna is fixed at the predetermined position on the bottom surface in step (c), and when the outer cover is assembled to the communication device, the extending portion contacts the circuit board of the communication device to make the antenna electrically connected to the circuit board.

15. The method according to claim 13, further comprising the step of:
 forming a position hole at the main body to assist in locating the antenna in the mold accommodating chamber.

16. The method according to claim 13, further comprising the step of:
 forming a fixing hole at the main body, wherein the fixing hole goes through from a first surface of the main body to a second surface corresponding to the first surface;
 wherein in step (c), the filling material can flow from the first surface to the second surface along the fixing hole, and after the filling material is solidified, it assists in fixing the antenna at the predetermined position firmly.

17. The method according to claim 13, further comprising the step of:
 forming an indentation at the predetermined position to assist in fixing the antenna.

* * * * *